United States Patent
Neyman et al.

(10) Patent No.: US 7,065,789 B1
(45) Date of Patent: Jun. 20, 2006

(54) SYSTEM AND METHOD FOR INCREASING HEURISTICS SUSPICION LEVELS IN ANALYZED COMPUTER CODE

(75) Inventors: Vitaly Neyman, Netanyia (IL); Itshak Carmona, Petach Tikva (IL); Ofer Rotschield, Kiryat Uno (IL)

(73) Assignee: Computer Associates Think, Inc., Islandia, NY (US)

( * ) Notice: Subject to any disclaimer, the term of this patent is extended or adjusted under 35 U.S.C. 154(b) by 973 days.

(21) Appl. No.: 09/862,801

(22) Filed: May 22, 2001

(51) Int. Cl.
*H04L 9/00* (2006.01)
*G06F 11/30* (2006.01)

(52) U.S. Cl. ............... 726/24; 726/25; 713/188
(58) Field of Classification Search ........... 713/188, 713/201; 726/24, 25
See application file for complete search history.

(56) References Cited

U.S. PATENT DOCUMENTS

| | | | |
|---|---|---|---|
| 5,452,442 A | 9/1995 | Kephart | |
| 5,485,575 A * | 1/1996 | Chess et al. | 714/38 |
| 5,826,013 A | 10/1998 | Nachenberg | |
| 5,978,917 A | 11/1999 | Chi | |
| 6,321,267 B1 * | 11/2001 | Donaldson | 709/229 |
| 6,519,703 B1 * | 2/2003 | Joyce | 713/201 |
| 6,711,583 B1 * | 3/2004 | Chess et al. | 707/104.1 |
| 6,757,830 B1 * | 6/2004 | Tarbotton et al. | 713/188 |
| 6,851,057 B1 * | 2/2005 | Nachenberg | 713/200 |

* cited by examiner

Primary Examiner—Kambiz Zand
(74) Attorney, Agent, or Firm—Baker Botts L.L.P.

(57) ABSTRACT

A method of selecting a detection method for analyzing computer code for malicious code. The method provides a plurality of malicious code detection methods, wherein at least some of the malicious code detection methods require different amounts of time to analyze for malicious code. A fastest one of the malicious code detection methods is selected. Computer code is analyzed for malicious code using the selected malicious code detection method. A probability of accuracy of a result of the analysis is determined. A next fastest one of the malicious code detection methods is selected and the analyzing and determining steps repeated, if the probability of accuracy is below a predetermined level. A result of the analysis is outputted if the probability of accuracy is at or above the predetermined level.

32 Claims, 6 Drawing Sheets

SYSTEM AND METHOD FOR INCREASING HEURISTICS SUSPICION LEVELS IN ANALYZED COMPUTER CODE

BACKGROUND OF THE DISCLOSURE

1. Field of the Disclosure

The present disclosure relates generally to malicious code detection methods and systems and in particular, to methods and systems that use heuristics logic for detecting malicious computer code.

2. Description of the Related Art

Antivirus (AV) systems may use various methods for detecting malicious code. Malicious code as referred to herein may include a computer virus capable of replicating itself and spreading. More specifically, malicious code may be understood to include, for example, a piece of software that may be designed and written to make additional copies of itself and spread from location to location within a system and/or from system to system. Typically, computer viruses spread without user knowledge or permission.

Some of the methods used to detect malicious code may include some form of heuristics logic to determine whether particular computer code is malicious. Heuristics logic applies rules to distinguish malicious code from non-malicious code. AV systems using heuristics logic may use self-educating techniques to improve performance.

When attempting to detect malicious code, heuristic detection methods may scan computer code to detect for malicious code. Some heuristic detection methods used by an AV system may provide "false results," which may be caused for various reasons. There are generally two types of false results that may occur when heuristic logic is used to scan for malicious code. A false positive (Type I) result is sometimes also referred to as a false alarm and is one in which the AV system detects malicious code when in reality, the code is clean. A false negative (Type II) result is one in which the AV system fails to indicate that malicious code is present, when in fact it is. Either type of false result can have serious consequences. Type I false results can be a problem, since the "cure" to recover from the false result may cause actual problems with the system. Type II false results can be a problem, since the actual malicious code goes undetected, leaving it to possibly wreak havoc on the system and possibly replicate itself to other portions of the system or to other systems.

Different heuristic detection methods may require different amounts of time and/or utilize varying amounts of computer resources when analyzing for malicious code. In addition, there can be a tradeoff between accuracy in detection of the malicious code and the amount of time and/or computer resources required by the heuristic detection method. For example, heuristic detection methods logic utilizing less time and/or computer resources, will usually be less accurate in detection of malicious code than heuristic detection methods that utilize more time and/or computer resources. That is, when attempting to be more accurate, heuristics logic may require more time and/or system resources, in order to provide a more accurate conclusion. This may result in decreased performance of the system being analyzed for the malicious code.

SUMMARY

A method of selecting a detection method for analyzing computer code for malicious code, comprises providing a plurality of malicious code detection methods, wherein at least some of the malicious code detection methods require different amounts of time to analyze for malicious code, selecting a fastest one of the malicious code detection methods, analyzing computer code for malicious code using the selected malicious code detection method, determining a probability of accuracy of a result of the analysis, selecting a next fastest one of the malicious code detection methods and repeating the analyzing and determining steps, if the probability of accuracy is below a predetermined level and outputting a result of the analysis if the probability of accuracy is at or above the predetermined level.

At least some of the malicious code detecting methods may use heuristic logic to detect for malicious code. The fastest one of the malicious code detecting methods may be a least accurate one of the plurality of malicious code detecting methods. A slowest one of the malicious code detecting methods may be a most accurate one of the plurality of malicious code detecting methods. The method may further comprise prompting a user to input a value to be used as the predetermined level and receiving the value input by the user and using the value as the predetermined level.

A system for selecting a detection method for analyzing computer code for malicious code, comprises means for storing a plurality of malicious code detection methods, wherein at least some of the malicious code detection methods require different amounts of time to analyze for malicious code, means for selecting a fastest one of the malicious code detection methods, means for analyzing computer code for malicious code using the selected malicious code detection method and outputting a result of the analysis, means for determining a probability of accuracy of the result of the analysis, means for selecting a next fastest one of the malicious code detection methods and repeating the analyzing and determining, if the probability of accuracy is below a predetermined level and outputting a result of the analysis if the probability of accuracy is at or above the predetermined level.

A storage medium includes computer executable code for selecting a detection method for analyzing computer code for malicious code. The computer executable code comprises code including a plurality of malicious code detection methods, wherein at least some of the malicious code detection methods require different amounts of time to analyze for malicious code, code for selecting a fastest one of the malicious code detection methods, code for analyzing computer code for malicious code using the selected malicious code detection method, code for determining a probability of accuracy of a result of the analysis, code for selecting a next fastest one of the malicious code detection methods and repeating the analyzing and determining steps, if the probability of accuracy is below a predetermined level and code for outputting a result of the analysis if the probability of accuracy is at or above the predetermined level.

A programmed computer system includes computer executable code for selecting a detection method for analyzing computer code for malicious code. The system comprises storage for storing a plurality of malicious code detection methods, wherein at least some of the malicious code detection methods require different amounts of time to analyze for malicious code, a unit for reading and executing computer executable code. The computer executable code comprises code for selecting a fastest one of the malicious code detection methods, code for analyzing computer code for malicious code using the selected malicious code detection method, code for determining a probability of accuracy of a result of the analysis and code for selecting a next fastest one of the malicious code detection methods and repeating the analyzing and determining steps, if the probability of accuracy is below a predetermined level. An output unit is provided for outputting a result of the analysis if the probability of accuracy is at or above the predetermined level.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

Figure 2:
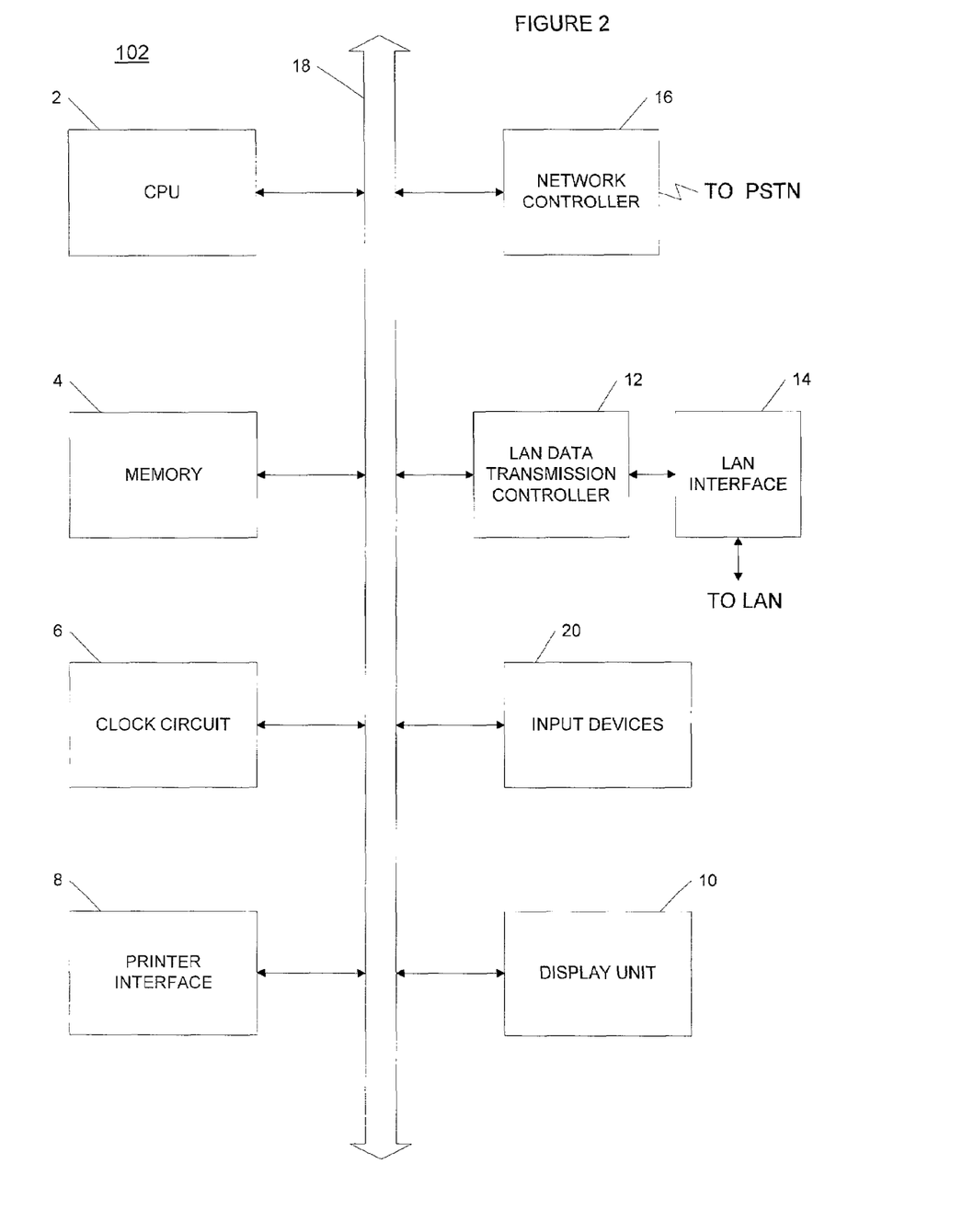
FIG. 2 is a block diagram of an example of a system to be monitored for malicious code.

A system to be monitored for malicious code may be a standard PC, laptop, mainframe, etc. or a network of such systems. FIG. 2 depicts an example of a system 102 that may be monitored for malicious code. FIG. 2 is a block diagram of exemplary components monitoring system 102 may include. Of course, monitoring system 102 may not include each component shown and/or may include additional components not shown. As shown, monitoring system 102 may include a central processing unit (CPU) 2, a memory 4, a clock circuit 6, a printer interface 8, a display unit 10, a LAN (local area network) data transmission controller 12, a LAN interface 14, a network controller 16, an internal bus 18 and one or more input devices 20 such as, for example, a keyboard and mouse.

CPU 2 controls the operation of system 102 and is capable of running applications stored in memory 4. Memory 4 may include, for example, RAM, ROM, removable CDROM, DVD, etc. Memory 4 may also store various types of data necessary for the execution of the applications, as well as a work area reserved for use by CPU 2. Clock circuit 6 may include a circuit for generating information indicating the present time, and may be capable of being programmed to count down a predetermined or set amount of time.

The LAN interface 14 allows communication between a network (not shown) and the LAN data transmission controller 12. The LAN data transmission controller 12 uses a predetermined protocol suite to exchange information and data with the other devices on a network. System 102 may also be capable of communicating with devices on other remote networks. System 102 may also be capable of communicating with other devices via a Public Switched Telephone Network (PSTN) using network controller 16. System 102 may also have access to a WAN (wide area network) and the Internet, for example. Internal bus 18, which may actually consist of a plurality of buses, allows communication between each of the components connected thereto.

The present disclosure relates to a system and method for detecting malicious code stored, for example, in memory 4. The system and method may be embodied as computer executable code itself stored in memory 4 or stored elsewhere and accessible by system 102. The system and method are capable of selecting the most accurate and fastest malicious code detection method from a plurality of available detection methods. Although described herein with respect to the use of heuristic detection methods, the system and method may be implemented using other types or combinations of types of detection methods capable of being sorted according to their speed, use of system resources and/or accuracy.

According to a first embodiment, a plurality of heuristic detection methods are sorted according to the speed at which they are capable of completing a detection scan for malicious code. The fastest heuristic detection method will very often utilize the least amount of system resources, but will tend to be less accurate than slower heuristic detection methods. The system according to this embodiment, will initially use the fastest heuristic detection method available to detect for malicious code. The present system will then determine the accuracy of the result. Depending on the result achieved by that detection method, the system will then decide what to do next. For example, if it is determined that the result is accurate to some predetermined level, the result will be used. However, if the result is not sufficiently accurate, the next fastest heuristic detection method will be used to detect for malicious code. The process will repeat until a detection method is used which achieves a result that is accurate to some predetermined level. The detection method that is found which achieves an accurate result (e.g., the predetermined level is met) will be the fastest method available, capable of providing a sufficiently accurate result. This is the fastest detection method available that is not likely to trigger false alarms.

Figures 1A, 1B:
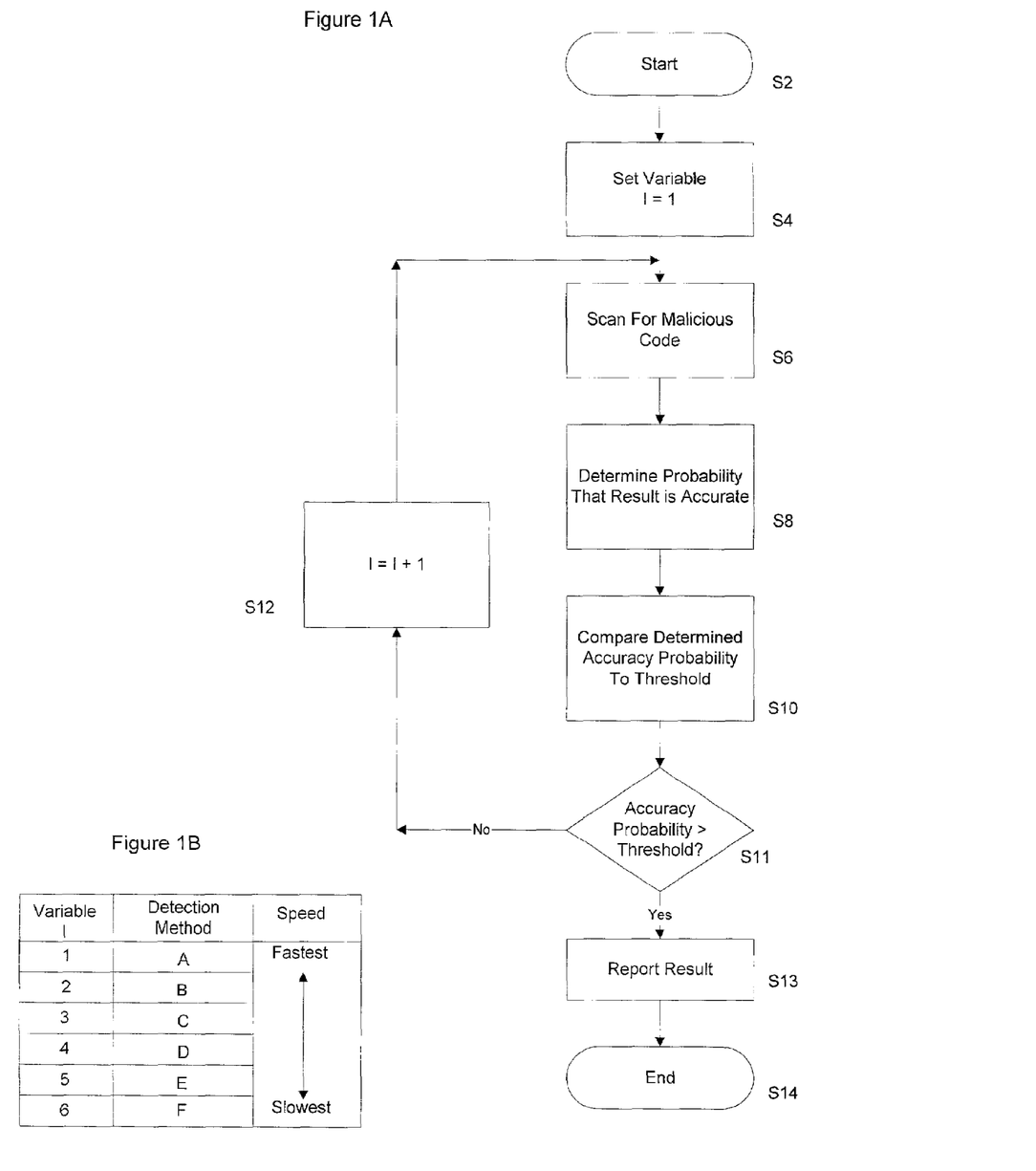
FIG. 1A is a flow chart for describing a process for selecting a malicious code detection method according to a first embodiment.
FIG. 1B is a chart showing the malicious code detection methods sorted according to the first embodiment.

FIG. 1A is a flow chart describing a process for selecting a heuristic detection method according to the first embodiment. When scanning for malicious code is started (Step S2), a variable I is set to 1 (Step S4). Variable I represents the heuristic detection method that will be used next to detect for malicious code, with 1 representing the fastest technique (and usually the least accurate). As shown in FIG. 1B, six different heuristic malicious code detection methods are provided and are labeled A–F for convenience. Of course, more or fewer methods may be provided for use by the system. As shown, the higher the variable I, the slower (but usually the more accurate) the heuristic detection method. In this example, method A is the fastest method available and method F is the slowest method available. The fastest heuristic detection method (A) is initially used to scan for malicious code (Step S6). The probability that the result of the scan is accurate (accuracy probability) is then determined (Step S8). For example, the heuristic detection method may look for different actions being performed by the code being examined. Based on the number of suspicious actions actually detected and their occurrence count, the probability is set. For example, the more suspicious actions detected and the higher their occurrence count, the higher the probability of accuracy. The determined accuracy probability is then compared to a predetermined threshold value (Steps S10). The predetermined threshold value may be based on a degree of accuracy required by the end user. For example, corporate environment users may require a higher degree of accuracy than home users. Accordingly, the predetermined threshold may be set higher for commercial systems than for home use systems. The predetermined threshold value can be factory set for each heuristic detection method or, as will be described below, may be set by the user. The predetermined threshold can be set intuitively at the factory or may be set by the user as will be described later below to achieve a degree of accuracy they user may require. This may be determined, for example, based on the user's degree of accuracy required for their particular implementation. If the accuracy probability is below the predetermined threshold for the detection method used (No, Step S11), the variable I is incremented (Step S12) and the next fastest heuristic detection method (B) is then used to scan for malicious code (Step S6). This process repeats until the accuracy probability is above the predetermined threshold level (Yes, Step S11). The result of the scan is then reported in a normal manner (Step S13) and the process ends (Step S14).

Utilizing the system described according to the first embodiment, a fastest, most accurate heuristic detection method can be selected to scan for malicious code.

According to a second embodiment, a plurality of heuristic detection methods are available and are sorted according to their expected accuracy. The degree of expected accuracy of heuristic virus detection methods can generally be readily determined. For example, the least accurate heuristic detection method will very often utilize the least amount of system resources and will often be the fastest. According to this embodiment, the heuristic detection methods are sorted according to their expected accuracy. The heuristic detection method expected to be the least accurate will initially be used to detect for malicious code. The system will then decide how to proceed, depending on the actual result of the detection. For example, if the actual result is accurate to some predetermined level, the result will be used. However, if the actual result is not sufficiently accurate, the next least accurate heuristic detection method available will be used to scan for malicious code. The process will repeat until a heuristic detection method is used which achieves a result that is accurate to the predetermined level. The detection method that is found which achieves an accurate result (e.g., the predetermined level is met) will be the fastest method available, capable of providing a sufficiently accurate result.

Figures 3A, 3B:
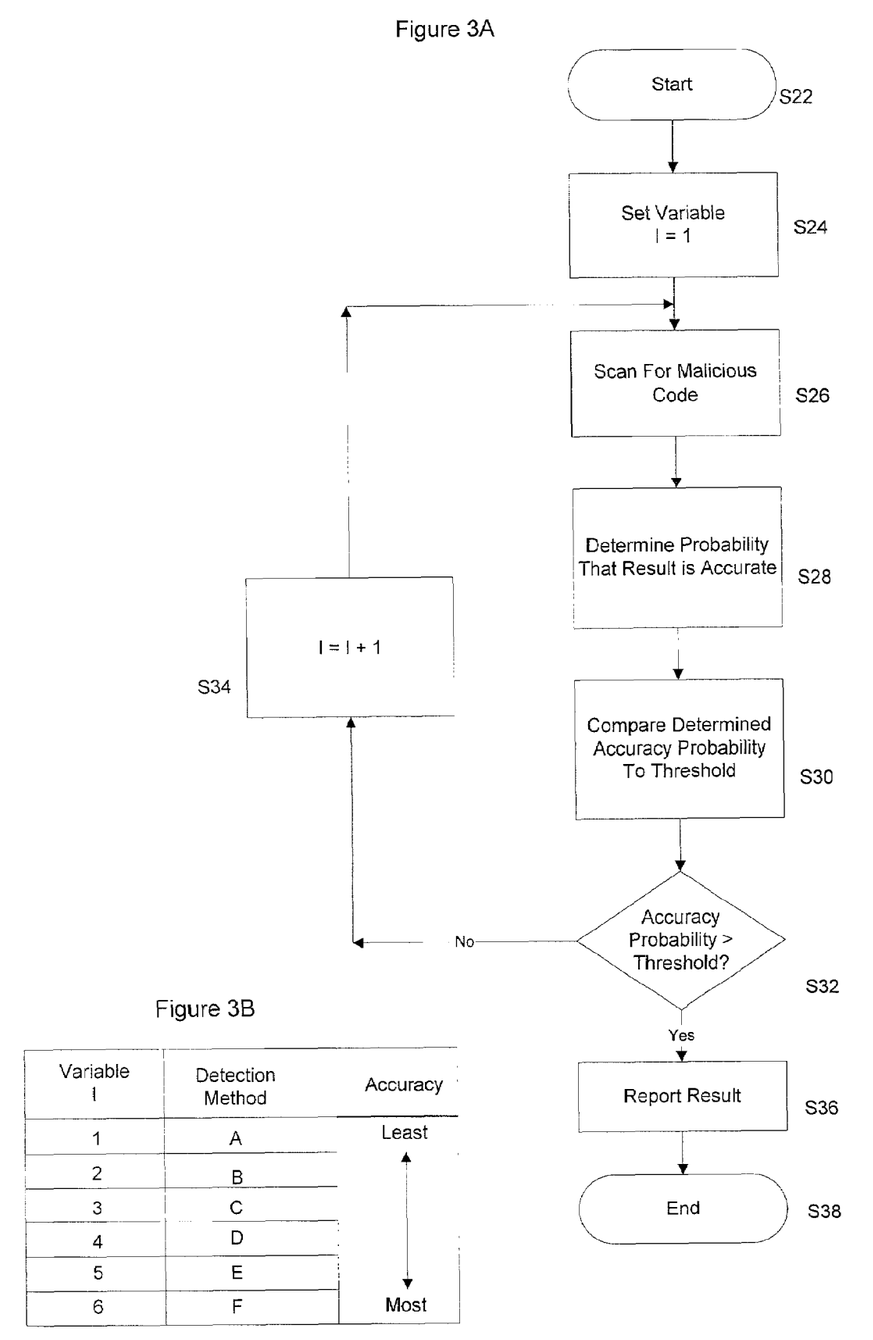
FIG. 3A is a flow chart for describing a process for selecting a malicious code detection method according to a second embodiment.
FIG. 3B is a chart showing the malicious code detection methods sorted according to the second embodiment.

FIG. 3A is a flow chart describing a process according to the second embodiment. When scanning for malicious code is started (Step S22), a variable I is set to 1 (Step S24). Variable I represents the heuristic detection method that will initially be used, with 1 representing the least accurate method (see FIG. 3B). The heuristic detection methods are sorted according to their expected degree of accuracy, with method A being the least accurate and method F being the most accurate. As shown, the higher the variable I, the more accurate (and slower) the heuristic detection method is. The least accurate heuristic detection method (A) is initially used to scan for malicious code (Step S26). The probability that the actual result of the scan is accurate is then determined (Step S28). For example, this probability can be determined in a manner similar to that described above with respect to FIG. 1. This determined probability is then compared to the predetermined threshold value (Step S30). The predetermined threshold value may also be set or determined as described above with respect to FIG. 1. If the probability is that the accuracy of the result of the scan is below the predetermined threshold (No, Step S32), the variable I is incremented (Step S34) and the next more accurate available detection method is used to scan for malicious code (Step S26). This process repeats until the probability is that the accuracy of the scan is at or above the predetermined threshold (Yes, Step S32). The result of the scan is then reported in a normal manner (Step S36) and the process ends (Step S38).

According to a third embodiment, a plurality of heuristic detection methods are available and are sorted according to the amount of computer system resources they use. The heuristic detection method utilizing the least amount of computer system resources will very often be the fastest, but will tend to be less accurate than methods that use higher amounts of computer system resources. The computer system resources utilized by a heuristic detection method may include one or more of processor usage, memory usage, read/write steps performed, etc., or a combination thereof. According to this embodiment, the heuristic detection method utilizing the least amount of computer system resources will initially be used to detect for malicious code. Depending on the result achieved by this method, the system will decide what to do next. For example, if the result is accurate to some predetermined level, the result will be used. However, if the result is not sufficiently accurate, the heuristic detection method utilizing the next highest amount of computer resources will be used to detect for malicious code. The process will repeat until a detection method is used which achieves a result that is accurate to the predetermined level. The detection method that is found which achieves an accurate result (e.g., the predetermined level is met) will be the method which utilizes the least amount of computer resources and is capable of providing a sufficiently accurate result.

Figures 4A, 4B:
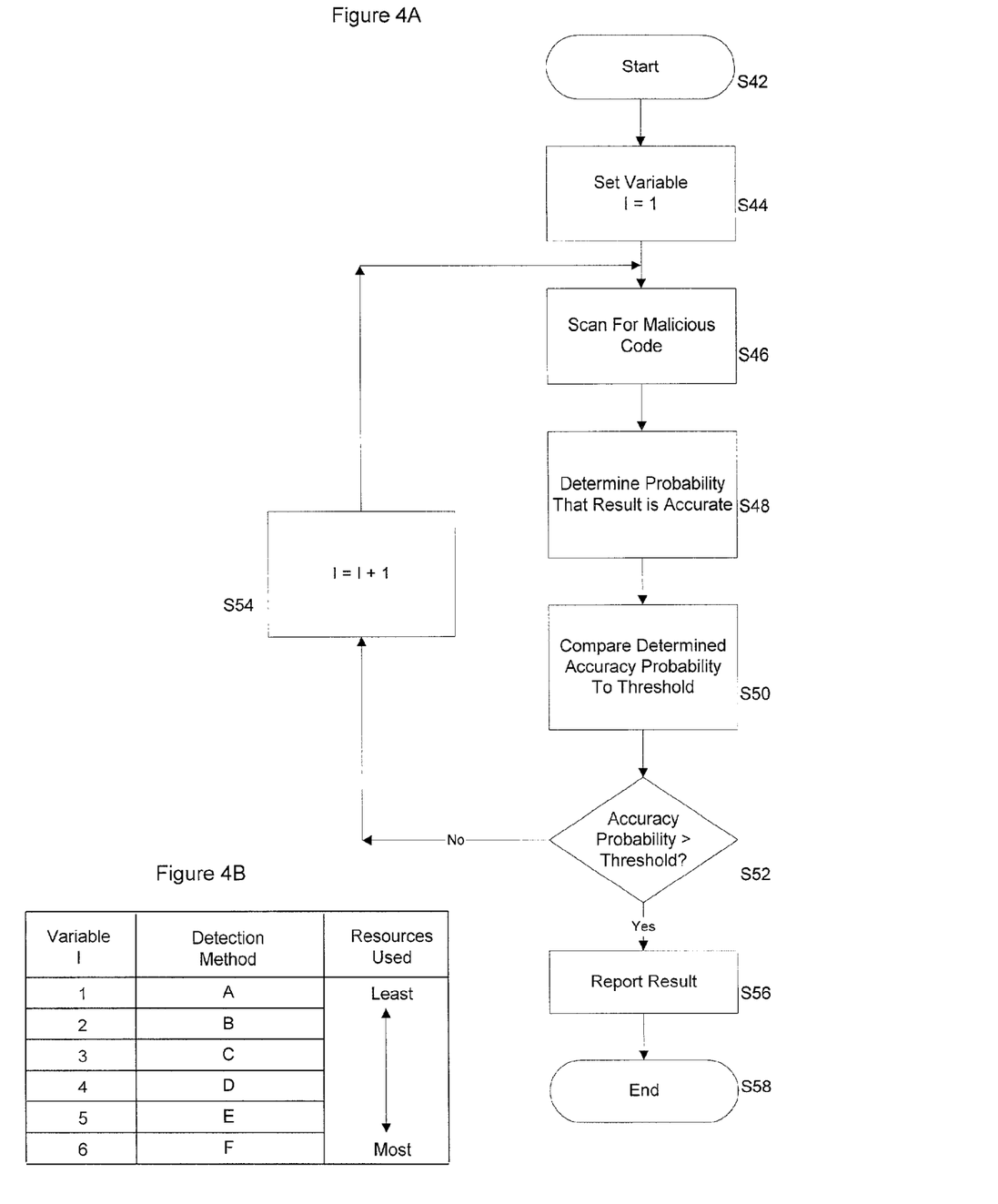
FIG. 4A is a flow chart for describing a process for selecting a malicious code detection method according to a third embodiment.
FIG. 4B is a chart showing the malicious code detection methods sorted according to the third embodiment.

FIG. 4A is a flow chart describing a process according to this third embodiment. When heuristic scanning for malicious code is started (Step S42), a variable I is set to 1 (Step S44). Variable I represents the heuristic detection method that will be used, with 1 representing the method that utilizes the least amount of computer resources (see FIG. 4B). The heuristic detection methods are sorted according to the amount of computer resources used, with method A utilizing the least amount of computer resources and method F utilizing the most computer resources. As shown, the higher the variable I, the more computer resources utilized by the heuristic detection method. The heuristic detection method utilizing the least amount of computer resources will then be initially used to scan for malicious code (Step S46). The probability that the result of the scan is accurate is then determined (Step S48). This probability may be determined as described above with respect to FIG. 1. The determined probability is then compared to a predetermined threshold value (Step S50), which may also be determined as mentioned above with respect to FIG. 1. If the probability is that the accuracy of the result of the scan is below the predetermined threshold (No, Step S52), the variable I is incremented (Step S54) and the heuristic detection method utilizing the next most amount of computer system resources is used to scan for malicious code (Step S46). This process repeats until the accuracy of the result of the scan is at or above the predetermined threshold level (Yes, Step S52). The result of the scan is then reported in a normal manner (Step S56) and the process ends (Steps S58).

Figure 5:
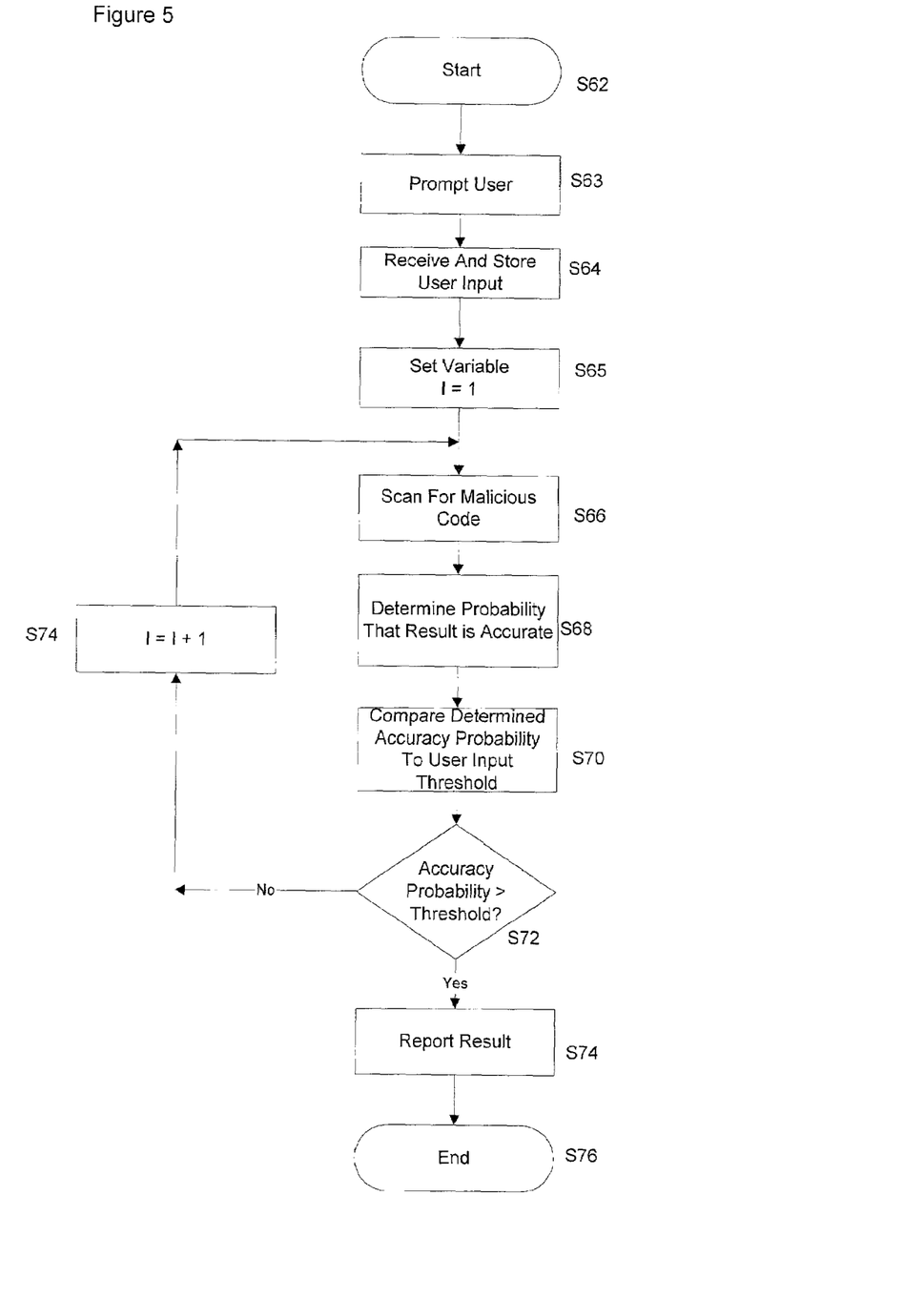
FIG. 5 is a flow chart for describing a process for selecting a malicious code detection method according to yet another embodiment.

According to yet another embodiment, the user can select the degree of accuracy required for the system. In this embodiment, as shown in FIG. 5, when heuristic scanning for malicious code is started (Step S62), the user is prompted for the degree of accuracy they require for the scan (Step S63). This can be in the form of a graphic user interface (GUT) that prompts the user to input a degree of accuracy they require for the detection scan. For example, the GUI may prompt the user to select a required degree of accuracy between 50%–100%. After the required degree of accuracy information input by the user is received, this information is stored (Step S64). Variable I is then set to 1 (Step S65). Variable I represents the heuristic detection method that will be used, with 1 representing the fastest technique. The fastest heuristic detection method is then initially used to scan for malicious code (Step S66). The probability that the result of the scan is accurate is then determined (Step S68). The determined accuracy probability is then compared with the desired degree of accuracy threshold as input by the user (Step S70). If the accuracy probability is less than the requested degree of accuracy (No, Step S72), the variable I is incremented (Step S74) and the next faster heuristic detection method is then used to scan for malicious code (Step S66). This process repeats until the determined accuracy probability is higher than the requested degree of accuracy (Yes, Step S72). The result of the scan is then reported in a normal manner (Step S74) and the process ends (Steps S76).

In the embodiment described above with respect to FIG. 5, the desired degree of accuracy may be input by the user. The system then initially uses the fastest heuristic detection method to scan for malicious code, and incrementally selects slower and slower methods until one is found that meets the required degree of accuracy. This process may be speeded up considerably. For example, instead of always starting with the fastest (and least accurate) detection method available, the first heuristic detection method used may be selected depending on the degree of accuracy required. For example, if a very high degree of accuracy (e.g., close to 90%) is required, it may be faster to begin the process for finding the most efficient heuristic detection method by initially using, for example, method C or D (FIG. 1B). Then, depending on the accuracy achieved, the next fastest method will be used to scan for malicious code or the result will be reported.

This embodiment will now be described by reference to FIG. 6. This embodiment is similar to the embodiment shown in FIG. 5. However, according to this embodiment, instead of using the fastest heuristic detection method, the first method used will depend on the degree of accuracy as specified by the user. After the process starts (Step S80), the user is prompted to select a required degree of accuracy between, for example, 50%–100% (Step S82). After the required degree of accuracy information is input by the user, the information is stored (Step S84). Then, depending on the required degree of accuracy as input by the user, the value of variable I will be selected (Step S86). For example, if a relatively low degree of accuracy is required, a lower variable I will be selected (see FIG. 1B), so that a relatively fast heuristic detection method will initially be used. If a relatively high degree of accuracy is required, a higher variable I will be selected, so that a relatively slower, but more accurate, heuristic detection method will initially be used. After variable I has been selected and set, the corresponding heuristic detection method is used to scan for malicious code (Step S88). The probability that the result of the scan is accurate is then determined (Step S90). The determined accuracy probability is then compared with the degree of accuracy as input by the user (Step S92). If the probability is less than the requested degree of accuracy (No, Step S94), the variable I is incremented (Step S96) and the next heuristic detection method is used to scan for malicious code (Step S88). This process repeats until the determined accuracy probability is higher than the requested degree of accuracy (Yes, Step S94). The result of the scan is then reported in a normal manner (Step S96) and the process ends (Step S98).

Figure 6:
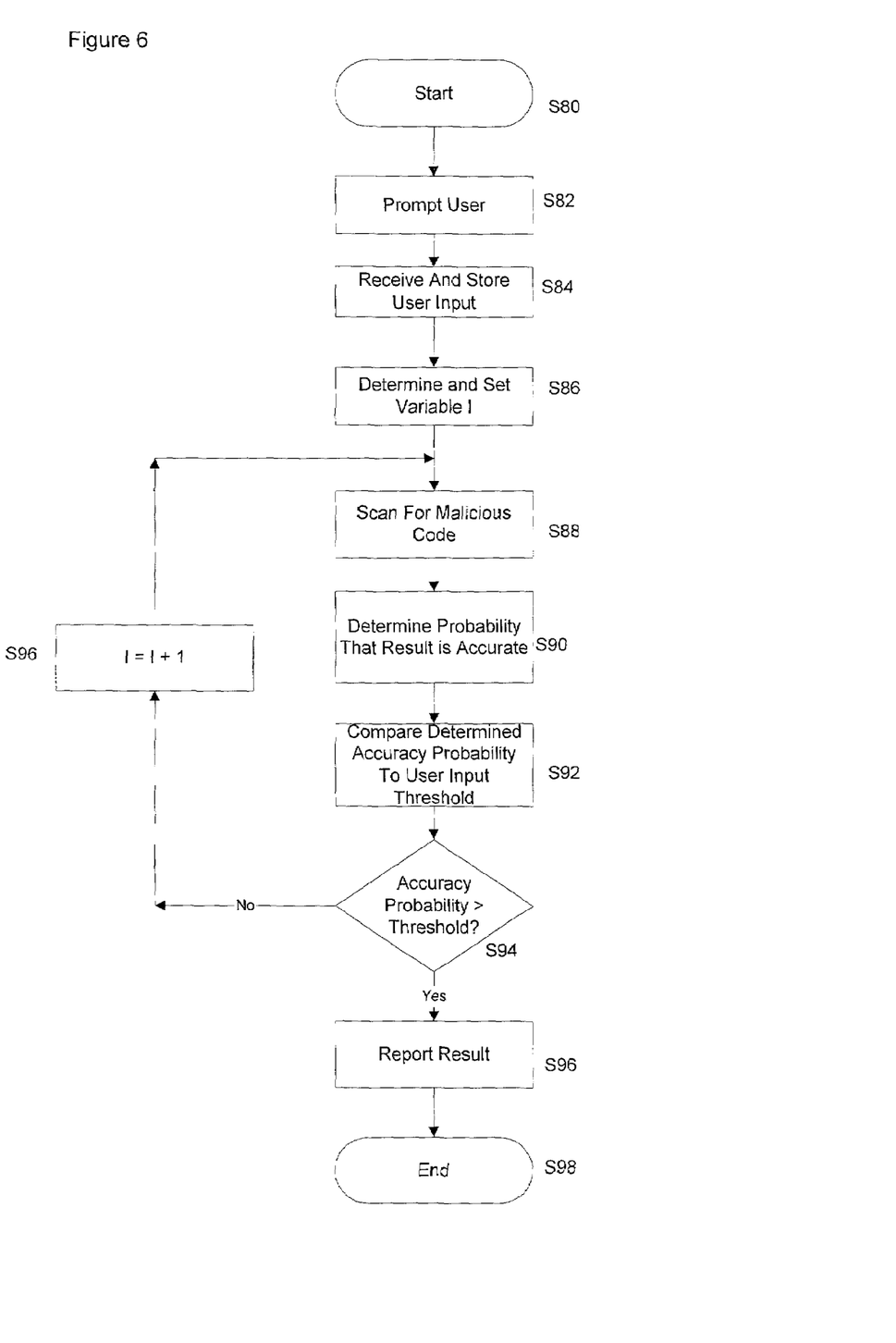
FIG. 6 is a flow chart for describing a process for selecting a malicious code detection method according to still another embodiment.

Each of the methods described in FIGS. 5 and 6 may also be implemented in systems in which the detection methods are sorted according to the degree of accuracy as described with respect to FIG. 3, or in which the detection methods are sorted according to the amount of computer resources utilized as described with respect to FIG. 4.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of selecting a detection method for analyzing computer code for malicious code, comprising:
   providing a plurality of malicious code detection methods, wherein at least some of the malicious code detection methods require different amounts of time to analyze for malicious code;
   selecting a fastest one of the malicious code detection methods;
   analyzing computer code for malicious code using the selected malicious code detection method;
   determining a probability of accuracy of a result of the analysis;
   selecting a next fastest one of the malicious code detection methods and repeating the analyzing and determining steps, if the probability of accuracy is below a predetermined level; and
   outputting a result of the analysis if the probability of accuracy is at or above the predetermined level.

2. A method of selecting a detection method as recited in claim 1, wherein at least some of the malicious code detecting methods use heuristic logic to detect for malicious code.

3. A method of selecting a detection method as recited in claim 1, wherein the fastest one of the malicious code detecting methods is a least accurate one of the plurality of malicious code detecting methods.

4. A method of selecting a detection method as recited in claim 1, wherein a slowest one of the malicious code detecting methods is a most accurate one of the plurality of malicious code detecting methods.

5. A method of selecting a detection method as recited in claim 1, further comprising prompting a user to input a value to be used as the predetermined level.

6. A method of selecting a detection method as recited in claim 5, further comprising receiving the value input by the user and using the value as the predetermined level.

7. A system for selecting a detection method for analyzing computer code for malicious code, comprising:
   means for storing a plurality of malicious code detection methods, wherein at least some of the malicious code detection methods require different amounts of time to analyze for malicious code;
   means for selecting a fastest one of the malicious code detection methods;
   means for analyzing computer code for malicious code using the selected malicious code detection method and outputting a result of the analysis;
   means for determining a probability of accuracy of the result of the analysis;
   means for selecting a next fastest one of the malicious code detection methods and repeating the analyzing and determining, if the probability of accuracy is below a predetermined level; and
   outputting a result of the analysis if the probability of accuracy is at or above the predetermined level.

8. A system for selecting a detection method as recited in claim 7, wherein at least some of the malicious code detecting methods use heuristic logic to detect for malicious code.

9. A system for selecting a detection method as recited in claim 7, wherein the fastest one of the malicious code detecting methods is a least accurate one of the plurality of malicious code detecting methods.

10. A system for selecting a detection method as recited in claim 7, wherein a slowest one of the malicious code detecting methods is a most accurate one of the plurality of malicious code detecting methods.

11. A system for selecting a detection method as recited in claim 7, further comprising means for prompting a user to input a value to be used as the predetermined level.

12. A system for selecting a detection method as recited in claim 11, further comprising means for receiving the value input by the user and using the value as the predetermined level.

13. A storage medium including computer executable code for selecting a detection method for analyzing computer code for malicious code, the computer executable code comprising:
   code including a plurality of malicious code detection methods, wherein at least some of the malicious code detection methods require different amounts of time to analyze for malicious code;
   code for selecting a fastest one of the malicious code detection methods;
   code for analyzing computer code for malicious code using the selected malicious code detection method;
   code for determining a probability of accuracy of a result of the analysis;
   code for selecting a next fastest one of the malicious code detection methods and repeating the analyzing and determining steps, if the probability of accuracy is below a predetermined level; and
   code for outputting a result of the analysis if the probability of accuracy is at or above the predetermined level.

14. A storage medium as recited in claim 13, wherein at least some of the malicious code detecting methods use heuristic logic to detect for malicious code.

15. A storage medium as recited in claim 13, wherein the fastest one of the malicious code detecting methods is a least accurate one of the plurality of malicious code detecting methods.

16. A storage medium as recited in claim 13, wherein a slowest one of the malicious code detecting methods is a most accurate one of the plurality of malicious code detecting methods.

17. A storage medium as recited in claim 13, further comprising code for prompting a user to input a value to be used as the predetermined level.

18. A storage medium as recited in claim 17, further comprising code for receiving the value input by the user and using the value as the predetermined level.

19. A programmed computer system including computer executable code for selecting a detection method for analyzing computer code for malicious code, the system comprising:
   storage for storing a plurality of malicious code detection methods, wherein at least some of the malicious code detection methods require different amounts of time to analyze for malicious code;
   a unit for reading and executing computer executable code, the computer executable code comprising,
   code for selecting a fastest one of the malicious code detection methods,
   code for analyzing computer code for malicious code using the selected malicious code detection method,
   code for determining a probability of accuracy of a result of the analysis, and
   code for selecting a next fastest one of the malicious code detection methods and repeating the analyzing and determining steps, if the probability of accuracy is below a predetermined level; and
   an output unit for outputting a result of the analysis if the probability of accuracy is at or above the predetermined level.

20. A programmed computer system as recited in claim 19, wherein at least some of the malicious code detecting methods use heuristic logic to detect for malicious code.

21. A programmed computer system as recited in claim 19, wherein the fastest one of the malicious code detecting methods is a least accurate one of the plurality of malicious code detecting methods.

22. A programmed computer system as recited in claim 19, wherein a slowest one of the malicious code detecting methods is a most accurate one of the plurality of malicious code detecting methods.

23. A programmed computer system as recited in claim 19, further comprising a unit for prompting a user to input a value to be used as the predetermined level.

24. A programmed computer system as recited in claim 23, further comprising a unit for receiving the value input by the user and using the value as the predetermined level.

25. A method of selecting a detection method for analyzing computer code for malicious code, comprising:
   providing a plurality of malicious code detection methods, wherein at least some of the malicious code detection methods have different expected degrees of accuracy when analyzing for malicious code;
   selecting a malicious code detection method having a lowest expected degree of accuracy;
   analyzing computer code for malicious code using the selected malicious code detection method;

determining an actual probability of accuracy of a result of the analysis;

selecting a next least accurate malicious code detection method and repeating the analyzing and determining steps, if the actual probability of accuracy is below a predetermined level; and outputting a result of the analysis if the actual probability of accuracy is at or above the predetermined level.

26. A system for selecting a detection method for analyzing computer code for malicious code, comprising:

means for storing a plurality of malicious code detection methods, wherein at least some of the malicious code detection methods have different expected degrees of accuracy when analyzing for malicious code;

means for selecting a malicious code detection method having a lowest expected degree of accuracy;

means for analyzing computer code for malicious code using the selected malicious code detection method and outputting a result of the analysis;

means for determining an actual probability of accuracy of the result of the analysis;

means for selecting a next expected least accurate malicious code detection method and repeating the analyzing and determining, if the actual probability of accuracy is below a predetermined level; and outputting a result of the analysis if the actual probability of accuracy is at or above the predetermined level.

27. A storage medium including computer executable code for selecting a detection method for analyzing computer code for malicious code, the computer executable code comprising:

code including a plurality of malicious code detection methods, wherein at least some of the malicious code detection methods have different expected degrees of accuracy when analyzing for malicious code;

code for selecting a fastest one of the malicious code detection methods;

code for analyzing computer code for malicious code using the selected malicious code detection method;

code for determining an actual probability of accuracy of a result of the analysis;

code for selecting a next expected least accurate malicious code detection method and repeating the analyzing and determining steps, if the actual probability of accuracy is below a predetermined level; and code for outputting a result of the analysis if the actual probability of accuracy is at or above the predetermined level.

28. A programmed computer system including computer executable code for selecting a detection method for analyzing computer code for malicious code, the system comprising:

storage for storing a plurality of malicious code detection methods, wherein at least some of the malicious code detection methods have different expected degrees of accuracy when analyzing for malicious code;

a unit for reading and executing computer executable code, the computer executable code comprising, code for selecting a malicious code detection method having a lowest expected degree of accuracy, code for analyzing computer code for malicious code using the selected malicious code detection method, code for determining an actual probability of accuracy of a result of the analysis, and code for selecting a next expected least accurate malicious code detection method and repeating the analyzing and determining steps, if the actual probability of accuracy is below a predetermined level; and an output unit for outputting a result of the analysis if the actual probability of accuracy is at or above the predetermined level.

29. A method of selecting a detection method for analyzing computer code for malicious code, comprising:

providing a plurality of malicious code detection methods, wherein at least some of the malicious code detection methods require use of different amounts of computer resources to analyze for malicious code;

selecting a malicious code detection method requiring use of the least amount of computer resources;

analyzing computer code for malicious code using the selected malicious code detection method;

determining a probability of accuracy of a result of the analysis;

selecting a malicious code detection method requiring the use of the next least amount of computer resources and repeating the analyzing and determining steps, if the probability of accuracy is below a predetermined level; and outputting a result of the analysis if the probability of accuracy is at or above the predetermined level.

30. A system for selecting a detection method for analyzing computer code for malicious code, comprising:

means for storing a plurality of malicious code detection methods, wherein at least some of the malicious code detection methods require use of different amounts of computer resources to analyze for malicious code;

means for selecting a malicious code detection method requiring the use of the least amount of computer resources;

means for analyzing computer code for malicious code using the selected malicious code detection method and outputting a result of the analysis;

means for determining a probability of accuracy of the result of the analysis;

means for selecting a malicious code detection method requiring the next least amount of computer resources and repeating the analyzing and determining, if the probability of accuracy is below a predetermined level; and outputting a result of the analysis if the probability of accuracy is at or above the predetermined level.

31. A storage medium including computer executable code for selecting a detection method for analyzing computer code for malicious code, the computer executable code comprising:

code including a plurality of malicious code detection methods, wherein at least some of the malicious code detection methods require use of different amounts of computer resources to analyze for malicious code;

code for selecting a malicious code detection method requiring the use of a least amount of computer resources;

code for analyzing computer code for malicious code using the selected malicious code detection method;

code for determining a probability of accuracy of a result of the analysis;

code for selecting a malicious code detection method requiring use of the next least amount of computer resources and repeating the analyzing and determining steps, if the probability of accuracy is below a predetermined level; and code for outputting a result of the analysis if the probability of accuracy is at or above the predetermined level.

32. A programmed computer system including computer executable code for selecting a detection method for analyzing computer code for malicious code, the system comprising:
storage for storing a plurality of malicious code detection methods, wherein at least some of the malicious code detection methods require use of different amounts of computer resources to analyze for malicious code;
a unit for reading and executing computer executable code, the computer executable code comprising,
code for selecting a malicious code detection method requiring use of a lowest amount of computer resources,
code for analyzing computer code for malicious code using the selected malicious code detection method,
code for determining a probability of accuracy of a result of the analysis, and
code for selecting a malicious code detection method requiring use of a next least amount of computer resources and repeating the analyzing and determining steps, if the probability of accuracy is below a predetermined level; and
an output unit for outputting a result of the analysis if the probability of accuracy is at or above the predetermined level.

* * * * *